US008473415B2

(12) United States Patent
Siegel et al.

(10) Patent No.: US 8,473,415 B2
(45) Date of Patent: Jun. 25, 2013

(54) SYSTEM AND METHOD FOR IDENTIFYING A POINT OF COMPROMISE IN A PAYMENT TRANSACTION PROCESSING SYSTEM

(76) Inventors: Kevin Paul Siegel, Mountain View, CA (US); Randi Annette Paynter, San Mateo, CA (US); Robert L. Grossman, River Forest, IL (US); Christopher Brown, Oakland, CA (US); Charles Raymond Byce, Mill Valley, CA (US); Thomas Dwyer, San Mateo, CA (US); Aoyu Chen, San Jose, CA (US)

( * ) Notice: Subject to any disclaimer, the term of this patent is extended or adjusted under 35 U.S.C. 154(b) by 0 days.

(21) Appl. No.: 13/100,042

(22) Filed: May 3, 2011

(65) Prior Publication Data
US 2011/0307382 A1 Dec. 15, 2011

Related U.S. Application Data

(60) Provisional application No. 61/331,274, filed on May 4, 2010.

(51) Int. Cl.
*G06Q 40/00* (2006.01)
(52) U.S. Cl.
USPC .............................................. 705/44; 705/38
(58) Field of Classification Search
USPC ..................................................... 705/10–44
See application file for complete search history.

(56) References Cited

U.S. PATENT DOCUMENTS

| | | | |
|---|---|---|---|
| 5,884,289 A | 3/1999 | Anderson et al. | |
| 6,094,643 A | 7/2000 | Anderson et al. | |
| 6,254,000 B1 | 7/2001 | Degen et al. | |
| 6,330,546 B1 | 12/2001 | Gopinathan et al. | |
| 6,516,056 B1 * | 2/2003 | Justice et al. | 379/145 |
| 6,714,918 B2 | 3/2004 | Hillmer et al. | |
| 7,263,506 B2 | 8/2007 | Lee et al. | |
| 7,337,119 B1 | 2/2008 | Geschwender et al. | |
| 7,376,618 B1 | 5/2008 | Anderson et al. | |
| 7,565,369 B2 | 7/2009 | Fan et al. | |
| 7,580,891 B2 | 8/2009 | Klebanoff | |
| 7,729,984 B1 * | 6/2010 | Nappi | 705/39 |
| 7,809,650 B2 | 10/2010 | Bruesewitz | |
| 8,010,451 B1 * | 8/2011 | Nappi | 705/39 |
| 2004/0210484 A1 * | 10/2004 | Lee | 705/14 |
| 2005/0055373 A1 | 3/2005 | Forman | |
| 2008/0040275 A1 * | 2/2008 | Paulsen et al. | 705/44 |
| 2008/0172316 A1 | 7/2008 | Adams | |
| 2009/0132404 A1 * | 5/2009 | King et al. | 705/35 |
| 2010/0169252 A1 | 7/2010 | Fan et al. | |
| 2010/0228580 A1 | 9/2010 | Zoldi et al. | |
| 2011/0196791 A1 * | 8/2011 | Dominguez | 705/44 |
| 2011/0238564 A1 * | 9/2011 | Lim et al. | 705/38 |

OTHER PUBLICATIONS

Search/Examination Report dated Jan. 5, 2012 from International Patent Application No. PCT/US2011/035249, 9 pages.

* cited by examiner

*Primary Examiner* — Frantzy Poinvil
(74) *Attorney, Agent, or Firm* — Kilpatrick Townsend & Stockton LLP

(57) ABSTRACT

A system, apparatus, and method for reducing fraud in payment transactions by identifying a potential point of compromise (POC) that may lead to subsequent fraudulent transactions, or confirming that a suspected point of compromise is in fact responsible for a security breach leading to fraudulent payment transactions. The invention is also directed to a system, apparatus, and method for identifying data or transaction characteristics that may be used to most effectively identify a point of compromise in a payment transaction system.

25 Claims, 7 Drawing Sheets

SYSTEM AND METHOD FOR IDENTIFYING A POINT OF COMPROMISE IN A PAYMENT TRANSACTION PROCESSING SYSTEM

CROSS REFERENCE TO RELATED APPLICATIONS

This application claims priority from U.S. Provisional Patent Application No. 61/331,274, entitled "Proactive Identification of Point of Compromise to Reduce Fraud in Payment Transactions," filed May 4, 2010, the contents of which is hereby incorporated in its entirety by reference for all purposes.

BACKGROUND

Embodiments of the invention are directed to systems, apparatuses and methods for reducing fraud in payment transactions, and more specifically, to a system and method that attempts to reduce fraud by identifying a possible point of compromise in the payment transaction processing system. Identification of such a possible point of compromise (POC) can lead to a reduction in fraud as a result of investigating the identified entity and taking enforcement actions where warranted, followed by remedial actions to prevent a similar type of compromise in the future. Where an investigation confirms that an entity was in fact a POC, a consumer or issuer can be notified of the possibility of the compromise of a payment account as a result of a transaction that was conducted with or processed by the POC. This can enable the notified party to cancel their payment account, place a watch on the account, or otherwise monitor their payment account(s) for an indication of fraudulent activity. Embodiments of the invention also provide a system, apparatuses and methods for determining the types of data or transaction characteristics that may be most effective for use in identifying a point of compromise or in confirming that a suspected point of compromise is in fact the source of a problem.

Embodiments of the invention may also be used to identify a payment account that may be susceptible to fraud as a result of a history of transactions with entities that pose an enhanced risk of being a point of compromise. In such a situation, the invention may be used to prospectively reduce possible future fraudulent transactions by notifying an account holder or issuer, or by placing a restriction on the account.

Portable consumer payment devices, such as debit cards or credit cards, are used by millions of people worldwide to facilitate various types of commercial transactions. In a typical transaction involving the purchase of a product or service at a merchant location, the portable consumer device is presented at a point of sale terminal ("POS terminal") located at a merchant's place of business. The POS terminal may be a card reader or similar device that is capable of accessing data stored on the device, where this data may include a consumer's identification data, authentication data, or account data, for example. Some or all of the data read from the device is provided to the merchant's transaction or data processing system and then to the acquirer, which is typically a bank or other institution that manages the merchant's account. Transactions in which a consumer device is presented to a merchant or accessed by a point of sale terminal are termed "card present" transactions since the payment device is in the same physical location as the merchant or terminal.

In addition to card present transactions, a consumer may also initiate a transaction in a situation in which the payment device is not in the same physical location as the merchant or terminal, and instead the relevant data is provided over a communications network to the merchant (termed a "card not present" transaction). For example, a card not present transaction involving the purchase of a product or service may be initiated by a consumer by providing payment data from a remote location to a merchant over a network such as the Internet. Transactions of this type are typically initiated using a computing device such as a personal computer or laptop computer. Card not present transactions may also be initiated or performed using a mobile device such as a mobile phone, in which case communication with a merchant or data processing system may occur over a cellular or wireless network.

Given the large number of payment transactions, the multiple ways of conducting such transactions, and the amounts of money involved, the detection and prevention of fraud is an important consideration of any payment transaction processing system. This is both to reduce losses and to ensure that the integrity of the system is maintained so that consumers will continue to use it. In this respect, there are multiple entities involved in the processing of payment transaction data that may serve as a potential site of a compromise. These include merchants, card reading devices, point-of-sale terminals (whether for contact or contactless portable consumer devices), data processors, acquirers, issuers, etc. If such a compromise occurs, it may lead to later instances of fraud in transactions that are processed by that entity or are processed by other entities. For example, a compromise at one entity involved in processing payment transaction data may lead to a breach of security in which payment account numbers and other information that may be used to conduct a transaction are stolen. The stolen data may then be used to attempt to conduct fraudulent transactions at a merchant unrelated to the location from which the data was stolen. For example, if a security breach (such as the unauthorized release of data or another form of "identity theft") occurs at a merchant or data processor, then multiple payment accounts may be exposed to the possibility of later fraudulent use.

Thus, an important component of any program designed to reduce fraud in payment transactions is the ability to identify actual or suspected points of compromise in the processing of the transactions. This may include identifying merchants or data processing organizations having characteristics that suggest that they were an actual point of compromise in the past, so that consumers who transacted with that merchant or organization may have an increased risk of later instances of fraud in their payment accounts.

Although there are conventional methods for identifying a point of compromise in a transaction processing system after fraud has occurred, the methods typically examine a very limited set of data or characteristics of the entities involved in processing payment transaction data. Further, conventional methods typically rely upon a single heuristic or algorithm to determine if the data being processed indicates the existence of a point of compromise. Thus, conventional methods do not provide a robust platform for examining multiple factors or potential indicia of a point of compromise and hence may not be as effective as desired. In addition, conventional methods do not provide a mechanism for monitoring the transactions being conducted by a payment account in order to identify accounts that are at-risk for fraudulent transactions in the future based on the risk of compromise of the entities involved in the transactions.

What is desired are a system, apparatus and method for identifying a possible point of compromise and thereby assisting in reducing fraud in payment transactions. Embodiments of the invention address the limitations of conventional approaches and other problems individually and collectively.

SUMMARY

Embodiments of the invention are directed to systems, apparatuses, and methods for reducing fraud in payment transactions by identifying a suspected point of compromise (POC) in the transaction processing system that may have been the source of information used to conduct fraudulent transactions. Embodiments of the invention are also directed to systems, apparatuses, and methods for reducing fraud in payment transactions by identifying a payment account that may be at-risk for future fraudulent transactions. Further, embodiments of the invention are also directed to systems, apparatuses, and methods for identifying data or transaction characteristics that may be used to most effectively identify a point of compromise in a payment transaction system. In some embodiments, once a point of compromise or an at-risk account is identified, other participants in the transaction processing system may be notified of the possible compromise of payment account data and take the appropriate corrective actions.

In contrast to conventional methods, embodiments of the invention may be utilized both retrospectively (to identify a likely point of compromise after fraud has occurred) and prospectively (to identify accounts that may be the subject of fraudulent transactions in the future). Thus, embodiments of the invention can be utilized as part of a fraud reduction program that includes determining which characteristics or indicia are the most reliable indicators that a merchant or data processing organization is a possible point of compromise before an actual compromise is known to have occurred. Once such a prospective point of compromise is identified, consumers having payment accounts that are now at greater risk of fraud can be notified and corrective actions may be taken to protect those consumers.

In one embodiment, the invention is directed to an apparatus for reducing fraud in a payment transaction system, where the apparatus includes: an electronic processor programmed to execute a set of instructions; and a data storage device coupled to the electronic processor and having the set of instructions stored therein, wherein when the set of instructions are executed by the programmed electronic processor, the apparatus determines a point of compromise measure for each of one or more entities involved in accessing or processing payment transaction data; determines a payment transaction measure for a payment transaction, the payment transaction measure obtained by combining the point of compromise measure for each of those of the entities involved in accessing or processing data for the payment transaction; determines a payment account measure for a payment account, wherein the payment account measure is obtained by combining the payment transaction measures for each of a plurality of payment transactions conducted using the payment account; evaluates the payment account measure to determine if it satisfies a predetermined condition indicating that the account is at-risk for fraud in the future; and generates a notification or alters the operation of the account if the payment account measure satisfies the predetermined condition.

In another embodiment, the invention is directed to a method of reducing fraud in a payment transaction system, where the method includes determining a point of compromise measure for each of one or more entities involved in accessing or processing payment transaction data; determining a payment transaction measure for a payment transaction, the payment transaction measure obtained by combining the point of compromise measure for each of those of the entities involved in accessing or processing data for the payment transaction; determining a payment account measure for a payment account, wherein the payment account measure is obtained by combining the payment transaction measures for each of a plurality of payment transactions conducted using the payment account; evaluating the payment account measure to determine if it satisfies a predetermined condition indicating that the account is at-risk for fraud in the future; and generating a notification or altering the operation of the account if the payment account measure satisfies the predetermined condition.

In yet another embodiment, the invention is directed to a method of identifying a point of compromise in a payment transaction processing system, where the method includes selecting a set of input data; selecting a signal to be obtained from the processing of the input data; determining a point of compromise measure for an entity from the signal; evaluating if the point of compromise measure satisfies a predetermined condition; and identifying the entity as a point of compromise if the point of compromise measure satisfies the predetermined condition.

Other objects and advantages of the invention will be apparent to one of ordinary skill in the art upon review of the detailed description of the invention and the included figures.

DETAILED DESCRIPTION

Figure 1:
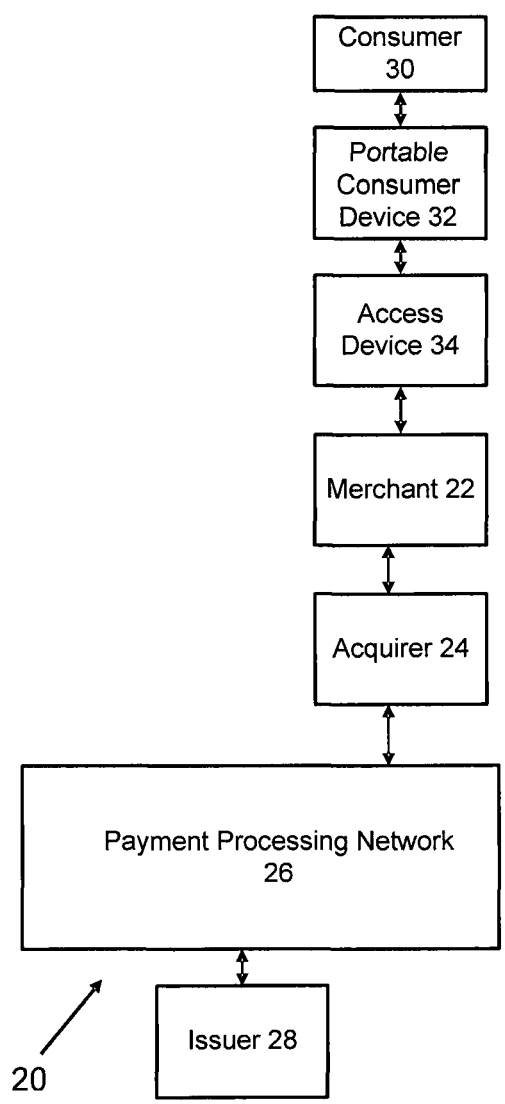
FIG. 1 is a functional block diagram illustrating the primary functional elements of an exemplary system for conducting an electronic payment transaction and processing payment transaction data that may be involved in implementing some embodiments of the invention.

For the purposes of describing embodiments of the invention, the following terms should be understood to have the indicated meaning, where such meaning is meant to be illustrative of the term and not to limit the scope of the invention: Point of Compromise (POC)—an entity within a payment transaction processing system or network at which a breach of security occurs resulting in the unauthorized release of data (e.g., account related security data, transaction data, account owner personal data, etc.); Entity—an agent or element of a payment transaction processing system that has access to sensitive account related or transaction related data (e.g., a merchant, an acquirer, an issuer, a point of sale terminal, a processor for a group of acquirers, etc.); Acquirer—a business entity (e.g., a commercial bank) that has a business relationship with a particular merchant and administers the merchant's account(s); Issuer—a business entity (e.g., a bank) which issues a portable consumer (payment) device such as a credit card, debit card, smart card, or contactless device to a consumer for the consumer to use to conduct a payment transaction; Point of Compromise (POC) Signal—the quantity or measure that an embodiment of the invention uses to determine an indication that fraud occurred or may occur; Point of Compromise (POC) Measure or Score—an indicia (typically numerical) that is derived from the POC Signal and provides an indication of whether an entity is likely to be a point of compromise or whether an account should be considered at-risk for future fraudulent activities (where the account level measure may be derived from consideration of one or more transaction level measures, each of which is derived from consideration of one or more entity level POC measures); Exposure window—a time period during which transaction data accessed or processed by an entity is considered as possibly having been made available to an unauthorized party as a result of a breach of security at the entity; and Fraud observation window—a time period during which transactions or accounts processed by the entity are examined to determine if a fraudulent transaction occurred within an account.

By way of background and to describe the context in which the invention may be practiced, it is noted that embodiments of the invention are typically implemented in the context of a payment transaction system. Specifically, they are implemented in the context of the acquisition of account data or the processing of transaction data, since a compromise is most likely to occur within an entity responsible for some aspect of the acquisition or processing of account or payment transaction data. In a typical payment transaction that may provide data used in an embodiment of the invention, a consumer provides a portable consumer device that includes a payment account or payment device identifier to a merchant or service provider. The portable consumer device may be provided in the form of a card (e.g., a magnetic stripe card or smart card with an embedded chip) accessed by a point of sale terminal or card reader, or as a device that incorporates a contactless element. Payment account information may also be provided by the consumer in a card not present situation (e.g., over a network as in an eCommerce transaction).

Embodiments of the invention may be used to identify an entity that is part of the transaction processing system and that is a suspected point of compromise (POC), where such a compromise led to confirmed fraud and may lead to subsequent fraudulent transactions. Once a suspected POC is identified, investigative actions may be carried out to determine if a compromise did in fact occur as a result of a breach of security at the entity. If the entity is confirmed as a POC, then the owners of accounts that may have been compromised can be notified and corrective actions may be taken to prevent future fraud or additional compromises. In some embodiments, a transaction level or account level score can be determined that indicates the likelihood that a particular transaction is fraudulent or that a particular account is likely to be the object of an attempt to conduct a fraudulent transaction. In such cases, the invention can be used to reduce possible occurrences of fraud in the future by notifying account owners, re-issuing accounts, placing restrictions on the use of the account, etc. Further, in some embodiments, the invention is also directed to systems, apparatuses, and methods for identifying data, entity characteristics or transaction characteristics that may be used to most effectively identify a point of compromise in a payment transaction system.

Embodiments of the invention include a data processing platform and associated methods for processing input data related to the transaction history of a specified set of payment accounts. These accounts may be those in which fraud is known to have occurred (i.e., a payment account in which the account owner reported a fraudulent transaction), accounts in which the transaction history indicates evidence of "testing" (i.e., a practice by one intending to commit fraud to attempt a set of transactions as a way of evaluating the fraud detection mechanisms of a transaction processing system), accounts used to conduct transactions processed by an entity during a relevant time period, or accounts having a characteristic suggesting that they may be used for fraudulent transactions. These are examples of possible input data and it is understood that other types or forms of data (such as transaction data for all transactions conducted using an account or set of accounts that were processed by an entity) may be used as an input to the invention.

Another type of input data that may be used in the invention is data for all of the transactions for which authorization was sought during a relevant time period. This data may be the output of a transaction authorization process, such as the Advanced Authorization (AA) process implemented by Visa. A transaction authorization process typically processes received information about a transaction (i.e., the account being used to conduct the transaction, the merchant involved, the amount of the transaction, etc.) and returns a score or indicator of the risk involved in the transaction. The output of the Advanced Authorization process may then be used by an issuer as part of deciding whether to approve or deny the transaction. The transaction authorization data may be used by the invention to assist in identifying other information about the transaction, or in understanding the significance of the fraud related or other input data by providing a way to remove bias, normalize, or provide a baseline for evaluating the input data.

Note that although authorization processes are used for evaluating the risk of a proposed transaction, embodiments of the invention are directed to evaluating the risk associated with an entity that may have access to data for multiple transactions and accounts. Thus, a much larger set of data needs to be considered, followed by assessing the probability that accounts transacting with the entity will experience fraud due to a compromise. For example, for the case of the entity being a merchant, the transactions passing through that merchant during a relevant time period (or window) may be used to identify the corresponding accounts used for those transactions. Next, for these accounts, future transactions (conducted within a second window) may be monitored in order to identify accounts that subsequently experience fraud. From this information, a profile for that merchant can be constructed, and from the merchant profile, a merchant-level point of compromise score can be computed. The compromise score corresponds to the probability that an account will experience fraud due to having transacted with an entity in the past. In some embodiments, if this compromise score is found to vary significantly between a first time period and a second time period, it may be indicative of a security breach at the entity.

Embodiments of the invention also allow a user to define certain parameters that will be used in the processing of the input data in order to identify a possible point of compromise in the payment transaction processing system. These parameters include setting the type or level of the entity that will be investigated as a possible source of a compromise, setting the time resolution for the processing of the data and generation of outputs, setting the data "windows" that define what set of data is examined for transactions that occurred in that window and what set of data is examined for indications of fraud as a result of those transactions, application of one or more data filters to remove noise or cross-correlation effects, etc.

After determination of the processing parameters, embodiments of the invention allow a user to select a fraud indicator, fraud measure, or other form of "signal" of interest. This signal represents the quantity or measure that the invention will investigate as an indication that fraud occurred, and is typically represented as a value of the indicator at a specified time. Examples of such signals include, but are not limited to, subsequent (confirmed) fraud rate (or fraud events) for an entity after a set of accounts engaged in a transaction with that entity or transactions were processed by that entity, the accumulated time-to-fraud for an entity, the presence of testing activity (as suggested by certain patterns of attempted transactions), or the elevation of transaction Advanced Authorization (AA) scores (implying an increase in risk for a set of transactions). Other potential signals include an inconsistent and discontinuous increase in transaction amounts, or a change to online buying behavior, geographic purchase patterns or other previous behavior.

Typically, the output of processing the input data will include a value for the "signal" as a function of time within the time period defined by the fraud observation window. The value of the signal will be a measure of the amplitude or level of the characteristic being investigated. The time resolution of the signal (i.e., the number of values of the measure of the amplitude or level within a range of time) will depend on the resolution used in processing the input data (i.e., whether multiple data points were combined into a single point, etc.). The values for the signal as a function of time will typically vary within the fraud observation window and one aspect of the invention is to convert or interpret these values as an indicia (e.g., a score) of the likelihood that the entity being investigated is a point of compromise. As will be described, this conversion or interpretation may include use of various types of statistical models or tools that generate a score by considering averages, means, standard deviations, variability, scatter, fit with a specified function, or other characteristics of the signal.

The selected signal of interest may be processed to increase the ability to identify a point of compromise as a result of the signal. Such signal processing may include application of filters to increase the signal-to-noise ratio (SNR), selective reduction of noise components, removal of certain trends that might render the output less reliable, normalization to a baseline to account for missing data, etc. After suitable signal processing, the invention produces an output signal (e.g., a measure of an entity characteristic as a function of time) for the selected entity type or level. The output signal value may then be subjected to one or more types of statistical analysis or models in order to produce a point of compromise (POC) measure or score for the entity. This may include application of one or more types of models or operations to the signal, thereby converting the signal values as a function of time into a score or indicia. Such models or operations may include, but are not limited to, consideration of average values, mean values, deviations from average or mean values, integrating the signal value over a suitable time period, application of a suitable transform or function to the signal, convolving the signal with a function representing a characteristic of the entity or the type of transactions, incorporation of historical information regarding the entity, the transactions or the accounts, etc.

The POC measure or score for the entity may be subjected to a threshold or other form of evaluation in order to determine if the score is indicative of a point of compromise (where the evaluation or inference method used may be modified to reduce false positives, provide a desired detection effectiveness or other operational characteristic, compare a current POC score to a previous one, etc.). If the score is considered indicative of a point of compromise, then appropriate alerts or notifications may be generated for issuers, consumers, acquirers or others involved in the payment transactions. An investigation may also be initiated, leading to corrective action if the entity is confirmed as a point of compromise. The POC score for one or more entities involved in a transaction may be used to calculate a transaction level POC score, which may indicate that a particular transaction (either conducted in the past or proposed as part of an authorization request) should be examined more closely as it may be fraudulent. The POC scores for all transactions conducted using a particular account may also be combined (via addition, appropriate weighted addition, application of a specified function or transform, etc.) to generate an account level POC score. This may be used to indicate that a particular account is at-risk for fraudulent activity in the future. In such cases, a warning may be issued, a payment account may be closed and re-issued to the consumer, transactions conducted using the account may be blocked or be subject to limiting conditions (e.g., number, frequency, amounts, merchant types), etc.

A discussion of the entities involved in processing and authorizing a payment transaction and their roles in the processing of payment transaction data follows. The discussion will help to identify certain entities which may be the source of a security breach, that is entities that may be a point of compromise (POC). FIG. 1 is a functional block diagram illustrating the primary functional elements of an exemplary system 20 for conducting an electronic payment transaction and processing payment transaction data that may be involved in implementing some embodiments of the invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized.

As shown in FIG. 1, in a typical transaction, a consumer 30 wishing to purchase a good or service from a merchant provides transaction data that may be used as part of a transaction authorization process, typically by means of a portable consumer device 32 that is capable of functioning as a payment device. Consumer 30 may utilize a portable consumer device 32 such as a card having a magnetic stripe encoded with account data or other relevant data (e.g., a standard credit or debit card) to initiate the transaction. In an eCommerce (electronic commerce) transaction, the consumer may enter data into a device capable of communicating with a merchant or other element of system 20, such as a laptop or personal computer. The consumer may also initiate the transaction using data stored in and provided from a suitable form of data storage device (such as a smart card, mobile phone or PDA containing a contactless element, or transportable memory device). As examples, a card or similar payment device may be presented to a point of sale terminal which scans or reads data from that card. Similarly, a consumer may enter payment account data into a computing device as part of an eCommerce transaction. Further, a consumer may enter payment account data into a cell phone or other device capable of wireless communication (e.g., a laptop computer or personal digital assistant (PDA)) and have that data communicated to the merchant, the merchant's data processing system, or a transaction authorization network by the device. A portable consumer device containing a contactless element may also initiate a payment transaction by means of communication with a merchant device reader or point of sale terminal using a short range communications mechanism, such as NFC (near field communications), RF, infra-red, optical, etc. Thus, in some cases an access device 34 may be used to read, scan, or otherwise interact with a consumer's portable device and thereby obtain data used in conducting a payment transaction.

The payment account data (and if needed for processing the transaction, other consumer data) is obtained from the consumer's device and provided to the merchant 22 or to the merchant's data processing system. The merchant or merchant's data processing system generates a transaction authorization request message that may include data obtained from the consumer's device as well as other data related to the transaction and the merchant. As part of generating the authorization request message, the merchant 22 or the merchant's transaction data processing system may access a database which stores data regarding the consumer, the consumer's payment device, and the consumer's transaction history with the merchant. The merchant transaction data processing system typically communicates with a merchant acquirer 24 (e.g., a commercial bank which manages the merchant's accounts) as part of the overall transaction authorization process. The merchant's transaction data processing system and/or merchant acquirer 24 provide data to Payment Processing Network 26, which among other functions, participates in the clearance and settlement processes which are part of the overall transaction processing. Payment Processing Network 26 may be operated in whole or in part by a payment processing organization, such as Visa. As part of the transaction authorization process, an element of Payment Processing Network 26 may access an account database which contains information regarding the consumer's payment history, chargeback or dispute history, credit worthiness, etc. Payment Processing Network 26 communicates with issuer 28 as part of the authorization process, where issuer 28 is the entity that issued the payment device to the consumer and manages the consumer's account. Consumer account data is typically stored in a consumer database which is accessed by issuer 28 as part of the transaction authorization and account management processes.

Payment Processing Network 26 may include data processing (sub)systems, elements, and networks, and may be configured to implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for the transactions.

Payment Processing Network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. Payment Processing Network 26 may use any suitable wired or wireless network, including the Internet, to facilitate communications and data transfer between its component system elements.

With reference to the system elements depicted in FIG. 1, it should be understood that there are multiple elements or entities that may be the site of a security breach and thus serve as a point of compromise (POC). For example, access device 34 may be compromised in such a way that account data and possibly other data obtained from portable consumer device 32 is improperly provided to an unauthorized party. In such a situation, the device being used to access or read data from the portable consumer device serves as the source of confidential data that is provided to a party that is not authorized to access that data. This may occur if a card reader is fitted with a device that can read the magnetic stripe on an inserted card and store that data for later access. It may also occur, for example, if a reader or point of sale terminal is improperly configured to transfer data obtained from a contactless device to another, unauthorized device. Another possible point of compromise is the merchant's data processing system itself. In such a case, account data obtained from a portable consumer device may be stored within the merchant's system and improperly accessed by an unauthorized user or improperly used by an authorized user of the system. Similarly, the security measures of an acquirer or issuer's data processing system may be breached, resulting in providing access to an unauthorized person who then uses data stored in those systems to attempt to conduct fraudulent transactions. Another possible point of compromise is a data processor (such as for a group of acquirers) that is part of the payment processing network. In such a case, a large number of account numbers and related information may be improperly obtained and used in later attempts to conduct fraudulent transactions.

Given the large number of transactions and the multiple entities that may be the site of a breach in the security of the payment transaction processing system, it is desirable that a system designed to identify a point of compromise be able to consider multiple factors and ways of processing data related to those factors in order to most effectively identify a point of compromise. Embodiments of the invention are able to do this by providing multiple ways of processing transaction related data and flexibility in the factors that are considered as an indicator of a point of compromise. Instead of being based on a single heuristic or rule base as are many conventional methods, embodiments of the invention are able to consider multiple possible indicia of a point of compromise or fraud (i.e., the "signals" described previously) as well as multiple ways of interpreting those signals to generate a point of compromise score that may be used to determine if an entity is likely to be the source of a compromise.

Figure 2:
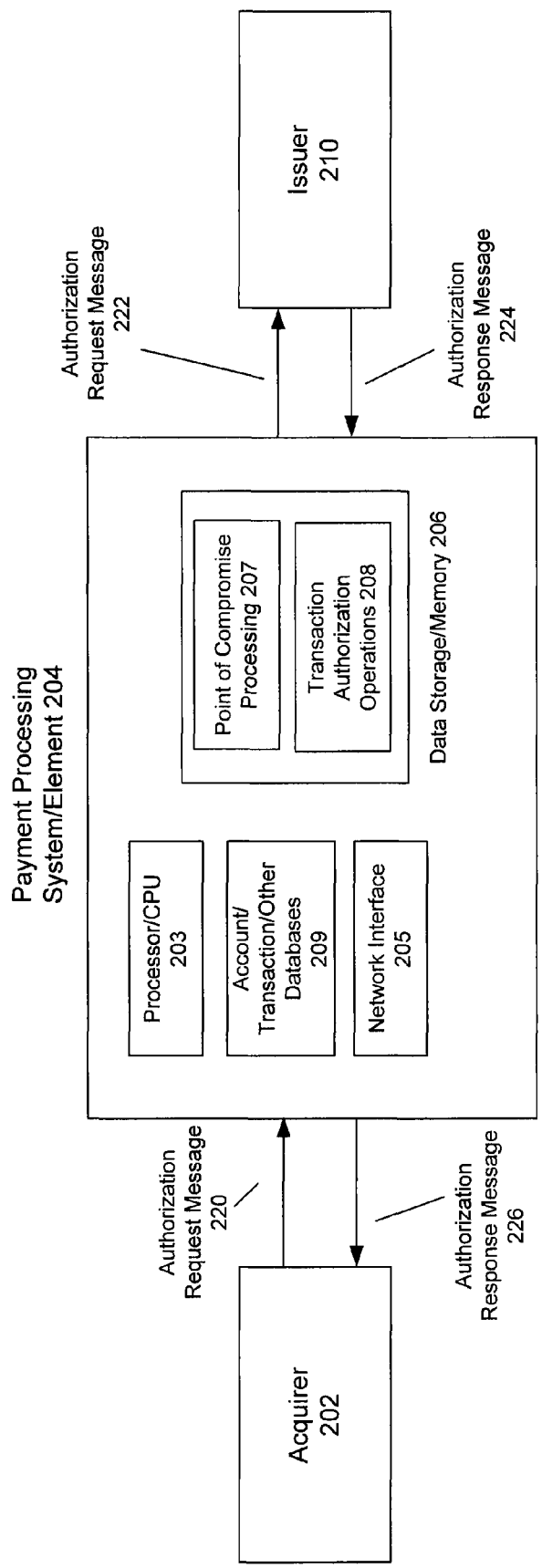
FIG. 2 is a functional block diagram further illustrating components that may be part of a payment processing network (or payment processing system) and elements that may interact with those components to enable a consumer to conduct a payment transaction, and as a result that may be involved in a data security breach or the identification of a point of compromise, in accordance with some embodiments of the invention.

FIG. 2 is a functional block diagram further illustrating components that may be part of a payment processing network (or payment processing system) and elements that may interact with those components to enable a consumer to conduct a payment transaction, and as a result that may be involved in a data security breach or the identification of a point of compromise, in accordance with some embodiments of the invention. Note that although identified as a payment processing system or element in the figure, element 204 may represent a data processing device, apparatus, server, group of servers, etc. that are part of a larger network. For example, element 204 may be one of a group of processing platforms operated by or providing data to an organization responsible for operating the payment processing network depicted in FIG. 1.

As shown in the figure, elements that interact with system 204 include an acquirer 202 which provides an authorization request message 220 for a payment transaction to payment processing system 204. Payment processing system 204 may provide a processed authorization request message 222 to issuer 210 to assist issuer 210 in deciding whether to authorize or deny a transaction. Issuer 210 provides payment processing system 204 with an authorization response message 224 containing an indication of whether the transaction has been approved or denied. Authorization response message 226 (which may be the same as message 224, or may contain other information) is provided to acquirer 202 to inform acquirer 202 (and ultimately the merchant and consumer) if the transaction has been approved or denied.

In processing the transaction authorization messages, or in processing other data related to payment transactions (or records relating to the processing of payment transaction data by other entities), payment processing system 204 may utilize one or more of the components or elements depicted in FIG. 2. Such components or elements include a processor or central processing unit (CPU) 203 that is programmed to execute a set of instructions, where some or all of those instructions may be stored in data storage device or memory 206. The instructions may include instructions which when executed, cause payment processing system 204 to perform one or more payment transaction data processing functions or operations (as suggested by "Transaction Authorization Operations" instructions or instruction set 208) and/or functions or operations intended to assist in reducing fraud by the identification or confirmation of a point of compromise (as suggested by "Point of Compromise Processing" instructions or instruction set 207). In performing these operations, processor or central processing unit 203 may access one or more databases 209 containing data and information that may be used by payment processing system 204 to identify or confirm a point of compromise, or to determine data or transaction characteristics that may be used for those purposes. Such data or information may include (but is not limited to) data regarding a consumer or group of consumers, the consumers who conducted a payment transaction with a specific merchant on a certain date or dates, the transaction and fraud history of those consumers subsequent to conducting a transaction with that merchant, the merchant's history with regards to fraud or charge backs, the transactions conducted by a group of consumers, etc. Payment processing system 204 may utilize network interface 205 to enable communication with other elements depicted in FIG. 2.

Figure 3:
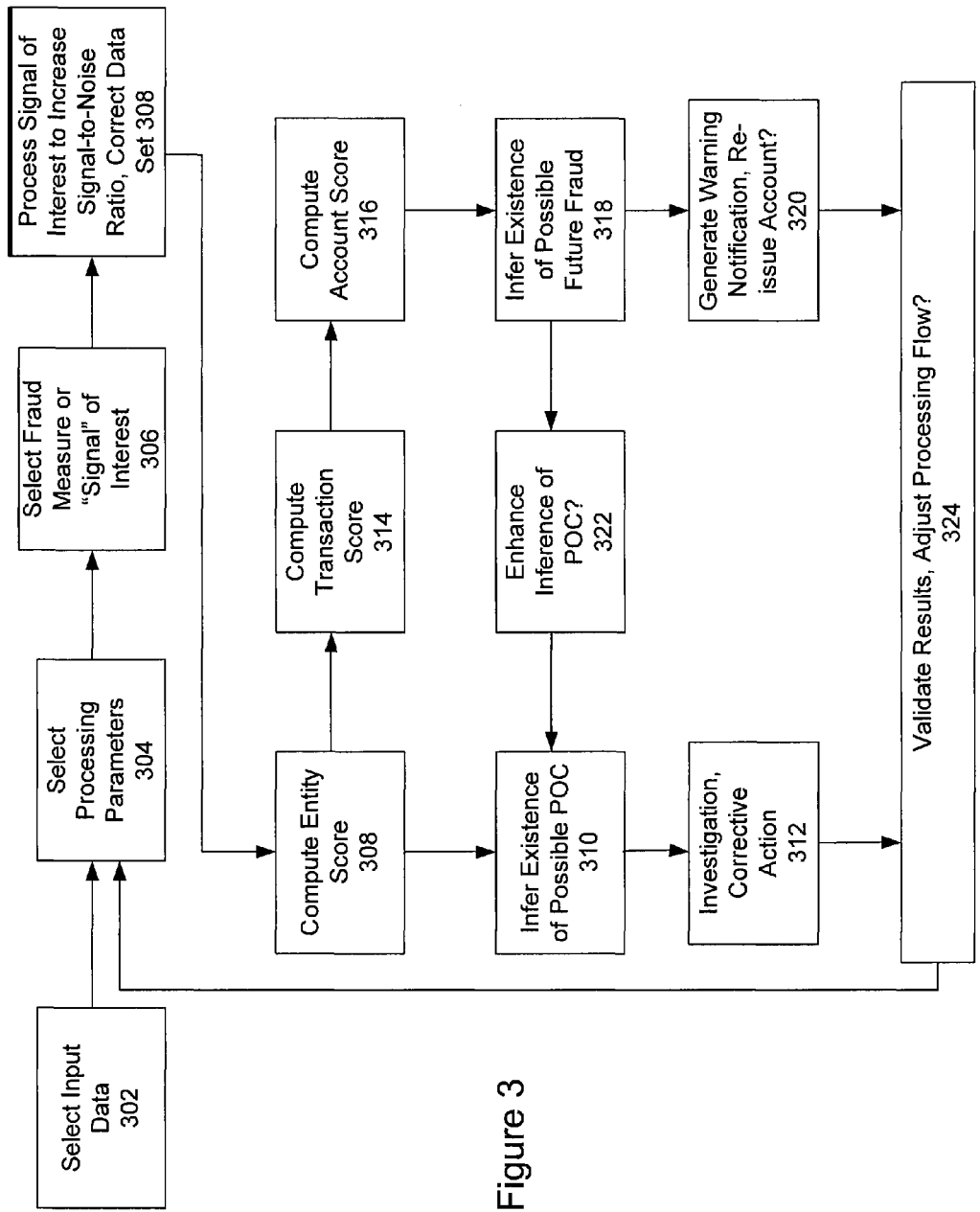
FIG. 3 is a flow diagram illustrating certain of the data processing operations that may be involved in implementing some embodiments of the invention.

FIG. 3 is a flow diagram illustrating certain of the data processing operations that may be involved in implementing some embodiments of the invention. The processes, operations or functions that will be described with reference to FIG. 3 may be implemented by a central processing unit (CPU), microprocessor or other suitable data processing element that is programmed to execute a suitable set of instructions. As an example, one or more of the processes, operations or functions depicted in FIG. 3 may be implemented by Processor/CPU 203 of FIG. 2, Data/Instruction Processor 602 of FIG. 6, or Central Processor 773 of FIG. 7.

As shown in the figure, in some embodiments, the inventive method operates by processing a set of selected input data (identified as "Select Input Data 302"). In some embodiments, the input data may include records of fraudulent transactions that have been reported by issuers (i.e., known or confirmed fraud). A transaction in which fraud is reported may be matched to its original transaction authorization data. This can be used to provide account data, merchant data and other information about the transaction. Other input data may include that for accounts in which the transaction history indicates evidence of "testing" (i.e., a practice by one intending to commit fraud to attempt a set of transactions as a way of evaluating the fraud detection mechanisms of a transaction processing system), transaction records for all accounts used to conduct transactions with a certain entity or entities, or accounts or transactions having a characteristic suggesting that they may be used to commit fraud or are fraudulent (such as a fraud score or other indicator falling within some range). Another type of input data that may be used in the invention is data for all of the transactions for which authorization was sought during a relevant time period. This data may be the output of a transaction authorization process, such as the Advanced Authorization (AA) process implemented by Visa. These are examples of possible input data and it is understood that other types or forms of data may be used as an input to the invention.

Embodiments of the invention may request from a user or otherwise determine certain parameters that will be used in the processing of the input data in order to identify a possible point of compromise in the payment transaction processing system (identified as "Select Processing Parameters 304"). These parameters include setting the type or level of the entity that will be investigated as a possible source of a compromise (e.g., merchant, issuer, data processor, acquirer or acquiring entity data processor, etc.), setting the time resolution for the processing of the data and generation of outputs, setting the data "windows" that define what set of data is examined for transactions that occurred in that window and what set of data is examined for indications of fraud as a result of those transactions, application of one or more data filters to remove noise or cross-correlation effects, etc. Note that if an entity is identified as a possible point of compromise, then a sub-domain of that entity may be investigated further to identify the actual source of the compromise.

For example, the inventors have determined that a window period of days, weeks, or months may be used to provide useful outputs. The time resolution may be selected to be the same as the window or some period smaller than the window. The selection of which time resolution (and in some cases the window) to employ may involve consideration of a large enough period to provide a degree of stability with a small enough period to detect changes. Further, the time resolution may be differed depending upon whether the invention is investigating the ability to detect a specified signal as opposed to an investigation as to when an identified breach occurred. In some embodiments, the inventors observed that for both merchant level and processor level entities, and for the known compromises reviewed, a time period of four weeks was an effective window period, and was generally more effective than a shorter window period.

As noted, in some embodiments, there may be two windows that require definition: (1) an exposure window that represents a time period during which transaction data processed by an entity is considered as possibly being made available to an unauthorized party as a result of a breach of security at the entity; and (2) a fraud observation window that represents a time period during which transactions or accounts processed by the entity are examined for evidence of fraud. The fraud observation window is typically chosen to be at some time after the exposure window as there is a time period required before the improperly acquired data is used in an attempt to commit a fraudulent transaction (which may be referred to as a "conversion" time or period). Note that in typical circumstances, a compromise is followed by a conversion period (which is the start of one or more attempts to commit fraud) but that fraud may not be detected until some time after the initiation of the fraudulent activities.

After determination of the processing parameters, embodiments of the invention may allow a user to select a fraud indicator, fraud measure, or other form of "signal" of interest (identified as "Select Fraud Measure or 'Signal' of Interest 306"). This signal represents the quantity or measure that the invention will use to determine an indication that a compromise occurred at a specified entity. Examples of such signals include, but are not limited to, subsequent (confirmed) fraud rate (or fraud events) for an entity after a set of accounts engaged in a transaction with that entity or transaction data was processed by that entity, the accumulated time-to-fraud for an entity, the presence of testing activity (as suggested by certain patterns of attempted transactions), or the elevation of transaction Advanced Authorization (AA) scores (implying an increase in risk for a set of transactions). Other potential signals include an inconsistent and discontinuous increase in transaction amounts, or a change to online buying behavior, geographic purchase patterns or other previous behavior.

Note that instead of a rate, the raw number of accounts or events that exhibited fraud after transaction data was acquired or processed by an entity may also be used. Further, the inventors determined that the effectiveness of a signal selected as an indicator of a possible compromise at an entity may depend upon certain characteristics of the transactions involved. For example, a signal useful for detecting a compromise in a situation of counterfeit fraud may not be as useful in cases of detecting a compromise in a situation of general fraud. Similarly, a signal useful for detecting a compromise in a situation of card present transactions may not be as useful in cases of detecting a compromise in a situation of card not present transactions. As will be described, embodiments of the invention provide a platform or mechanism for not only identifying possible points of compromise, but also for investigating which factors, signals, or other characteristics are most effective for identifying a point of compromise for varying types of transactions, entities, etc.

The selected signal of interest may be processed to increase the ability to identify a point of compromise as a result of the signal (identified as "Process Signal of Interest to Increase Signal-to-Noise Ratio, Correct Data 308"). Such signal processing may include application of filters to increase the signal-to-noise ratio (SNR), reduction of specific noise components (such as the auto-correlation between accounts), removal of certain trends that might render the output less reliable, normalization of data values to a baseline to account for missing data, etc. For example, a suitable baseline might be that of a nationwide set of data that contributes to a signal of interest. Further, because the volume of transactions typically fluctuates over the year, the signal may be processed to remove or suppress signal fluctuations that arise from changes in transaction volume (such as seasonal changes).

After suitable signal processing, the invention provides a measure, score or value associated with the selected signal for the selected entity type or level (identified as "Compute Entity Score 308"). The processed signal may be in the form of an amplitude or measure of the signal as a function of time, and may be subjected to one or more types of statistical analysis in order to produce a point of compromise score for the entity of interest. Suitable types of statistical analysis includes application of baselines, Z-scores, or a combination of baselines and Z-scores. Other statistical approaches may also be used, such as filters, odds ratios or the log of odds ratios computed from baselines, application of a change detection algorithm or processing method, application of a specific model representing the entity, selective weighting, scaling, application of a specified weighting function, convolution with a function representing a characteristic of the entity or the type of transactions, etc. In general, any suitable type of statistical analysis technique may be used that can be applied to the processed (and typically time-varying) signal to provide an output measure or score, where the applied technique provides a desired degree of confidence that the output measure or score can be relied upon to infer the existence (or possible existence) of a point of compromise. This may include combining the score with other account related data to obtain a final score that is indicative of a possible POC, consideration of how much the score for an entity deviates from a mean or average score for a group of similar entities, etc. Various ranking methodologies, heuristics, or algorithms may be used to determine whether a score should be relied upon to indicate the possible existence of a POC, or whether a specific entity in a group of entities is more likely than the others to be a POC.

Once calculated, the POC score for an entity may be subjected to a threshold or another form of evaluation in order to determine if the score should be considered indicative of a point of compromise. If the score exceeds the threshold or satisfies another specified criteria (e.g., average score over a predetermined time period, score exceeding a predetermined value for a specified number of days or investigation periods, a score that differs from a score for a previous time period by a specified amount, etc.), then an alert or notification may be generated. An investigation may also be initiated, leading to corrective action if the entity is confirmed as a point of compromise. This may include performing a more in-depth analysis of the fraudulent activities associated with the entity, monitoring the fraud trend for the entity over time, etc. The processes used to determine whether a POC score should be considered indicative of a point of compromise are represented by the module labeled "Infer Existence of Possible POC 310" in the figure. The follow-on activities that may be implemented as a result of a POC score for an entity that indicates the existence of a point of compromise are represented by the module labeled "Investigation, Corrective Action 312" in the figure.

Note that an entity POC score may also be derived by application of a statistical analysis technique (such as logistic regression) to a set of data for a single entity, or for a group of entities. Thus, in some embodiments, a "signal" may be generated for multiple entities, with a statistical method applied to assist in identifying the most likely source or sources of a compromise. Further, trend analysis of the POC score or scores over time may be used to confirm the existence of a point of compromise (e.g., a POC score that increases and remains at an elevated value for a sufficient period of time). Note also that the time windows may be varied as part of the analysis in an effort to identify the proper time period during which the compromise occurred as well as to determine the delay between exposure and the actual occurrence of the bulk of the fraudulent actions (i.e., the time period for conversion of improperly obtained data into actual attempts at fraud). Further, a regression technique may be applied to a set of values for possible time windows to identify the most likely exposure period. In this way the invention provides a platform for determining which parameter values are most effective for identifying that a compromise occurred and for identifying which of several entities is the most likely source of a compromise. Note that in the case where the input data included data for confirmed (known) fraud, the invention may be used to identify a likely source of the compromise that led to that fraud. In such cases, the invention provides a tool for retrospectively identifying a point of compromise and then taking remedial or corrective action.

Note that depending on the input data used, the output of the invention may be useful for identifying risks to accounts that are likely to occur in the future, while other forms of input data may be more effective for identifying a possible point of compromise before actual fraud occurs. For example, use of confirmed fraud data is believed to provide a more effective indication of the subsequent risk to an account or accounts, while the presence of "testing" activity or elevated Advanced Authorization scores may provide a mechanism for detecting a possible point of compromise prospectively (i.e., before fraud or a significant amount of fraud occurs).

Once the POS score is determined for an entity or entities, a transaction level POC score may be determined (as suggested by the module "Compute Transaction Score 314" in the figure). In some embodiments, this may be done by combining the POC score for each entity that may be associated with a transaction (e.g., the merchant, the data processor, the point of sale terminal, etc.). The combination may be accomplished by any suitable method, including summation, weighted summation, multiplicative combinations, application of a suitable transform, convolution with a specified function, etc. The transaction level POC score may indicate that a particular transaction (either conducted in the past or proposed as part of an authorization request) should be examined more closely, as it may have been (or be) fraudulent (e.g., because the POC score of an entity involved in the transaction or the scores for multiple entities involved in the transaction suggest that a compromise occurred).

As indicated, in some embodiments, in order to determine a transaction level POC score, it may be desirable to consider all independent sources of risk so that the score reflects the contributions from multiple entities (e.g., merchant, merchant acquirer, issuer, issuing acquirer, etc.). However, as recognized by the inventors, in practice, this approach may be overly complex and computationally inefficient. Signals are rare events, and for short time windows, entities almost always exhibit zero or negligible risk. When the risk is non-negligible, two situations may have occurred. In the first, there is one entity exhibiting much greater risk than others. In this situation, all but the high risk contribution may be ignored and the risk is assumed to be derived primarily from one source. In the second situation, two or more entities exhibit a similar level of elevated risk. In this case, the entities may be correlated and should not be considered as independent sources. While it is possible that these entities have multiple independent signals occurring as part of a single transaction, the inventors believe such an occurrence to be rare and one that can be ignored in a first order calculation. Note that since the invention is typically used to examine one entity at a time, in such cases the possibility of multiply compromised transactions is ignored or considered to be a lower order effect.

The POC scores for all transactions conducted using a particular account may also be combined (via addition, addition with appropriate weighting or filtering, application of a specified transform, convolution using a specified function, etc.) to generate an account level POC score (as suggested by the module labeled "Compute Account Score 316" in the figure). The account level POC score may be used to indicate that a particular account is at-risk for fraudulent activity in the future by application of a suitable threshold or trend analysis (as suggested by the module labeled "Infer Existence of Possible Future Fraud 318" in the figure). In such cases, a warning may be issued, a payment account may be closed and re-issued to the consumer, certain types of transactions may be blocked (based on the merchant category, number of transactions or frequency of transactions), etc. This is an example of a pro-active or prospective use of the methods and operations that are part of implementing the invention. In such cases, an account may be flagged and monitored as a likely candidate for future fraudulent transactions based on the cumulative POC score for transactions being conducted using the account.

Note that the transaction and account level POC score(s) may be processed to identify patterns, data values, transaction trends, transaction types, or other information that contribute to relatively higher POC scores. This may provide an enhanced ability to identify accounts that are at greater relative risk to be the object of an attempt at committing fraud. Regardless of how it is identified, when such an account is identified, a warning may be issued, a payment account may be closed and re-issued to the consumer, etc. (as suggested by the module labeled "Generate Warning Notification, Re-Issue Account? 320" in the figure).

Note that in some embodiments, the invention may be used to provide an indicator of prospective fraud in an account on a real-time or pseudo real-time basis. In such a use case, the invention may be used to monitor some or all accounts conducting transactions within a payment network (such as that operated by Visa) and provide an assessment of the risk of an account being exposed to fraudulent activities at a later date. This assessment may be based on the cumulative impact of the POC scores (or changes in the scores) of the entities involved in the transactions being conducted using the account. This type of assessment may be especially relevant for accounts that were involved in a confirmed compromise incident (such as by having conducted a transaction with a known POC). When an account is determined to be at-risk, transactions may be limited, subjected to conditions, blocked, accounts closed and re-issued, etc. In some embodiments, the results of such an assessment may be appended to an authorization message or other form of transaction processing message as an indication that the account or transaction should be monitored or otherwise subjected to a higher level of scrutiny.

Note further that in some embodiments, the results of the processing implemented by module 318 may be used to improve the detection or identification of a point of compromise at the entity level. For example (as suggested by the module labeled "Enhance Inference of POC 322" in the figure), the risk associated with an account (based on the account level POC score and the processes implemented by module 318) may be used to improve the ability of the invention to identify an entity as a point of compromise. This may be done by using the risk sources in the account level risk assessment to better determine which of several possible entities is the point of compromise. The account level POC score and account risk assessment may also be used to alter the processes implemented in module 310 by altering filters, threshold values, etc.

In determining an account level POC score, the inventors recognized that although each account transaction can contribute to the overall risk for the account, certain data processing assumptions may be useful in making the determination more computationally efficient and practical to implement. In some sense the goal is to accurately account for all independent transactions but to not overstate the risk due to correlated events. As the inventors recognized, accounts with multiple transactions have more opportunities for compromises and multiply compromised accounts are a possibility.

To understand the computational issues involved in some implementations of the invention, consider an account with N transactions. A complete calculation of risk involves the computation of all correlations between all permutations of transactions, which is non-trivial and becomes intractable as N becomes large. Instead, it may be preferable to apply an estimate or reduction in complexity that reduces the number of correlation calculations. In this regard, the inventors noted the following observations:

Additional transactions through the same entity in the same period do not contribute additional risk;

As a limiting case, the account risk can be no less than the risk of the riskiest transaction. Because, in some cases, the risk of one transaction dominates, the maximum Transaction POC Score may be used to represent the Account POC Score without introducing a significant error. This is especially true of singly compromised accounts;

When multiple transactions exist, a valid approximation is to use only 2-way interactions in the risk calculations. The computation complexity is reduced to $O(N^2)$. This produces a better, but still potentially understated risk;

When a subset of transactions exhibit an elevated risk, the account risk can be considered to derive from these "risky" transactions. The others may be considered to contribute a negligible risk. As a result, 2-way correlations only need to be calculated for these "higher risk" transactions; and Since correlated, transactions contribute less risk to the account, a valid simplification is to eliminate correlated transactions from consideration. A good approximation for risk correlation is similarity between attractions. Less risky transactions that share transaction attributes with more risky transactions can therefore be ignored.

As a result of the above considerations, to a first approximation, the Account level POC Score may be taken to be the highest Transaction POC score for the account. Further, in some cases it may be important to understand the strength (or confidence level) of an estimation. A simple approximation is that the confidence of the estimate is proportional to the difference between the Transaction POC Scores of the two riskiest transactions. While this only captures the first-order effects, it is believed by the inventors to be effective in practice.

In some embodiments, the invention may incorporate a feedback or learning mechanism that provides an adaptive control on certain aspects of the data processing operations implemented by the invention. For example (as suggested by the module labeled "Validate results, Adjust Processing Flow? 324" in the figure), identification of possible point(s) of compromise generated by the invention may be compared to actual (i.e., known) points of compromise that led to fraud to validate the results of the invention. Further, by performing a sensitivity analysis or other form of evaluation, the parameters of the data processing operations implemented by the invention may be investigated and modified to produce more accurate results. Further, various combinations of the parameters may be selected and run as "test cases" to determine which are more or less likely to produce results that are validated by actual knowledge of points of compromise.

Figure 4:
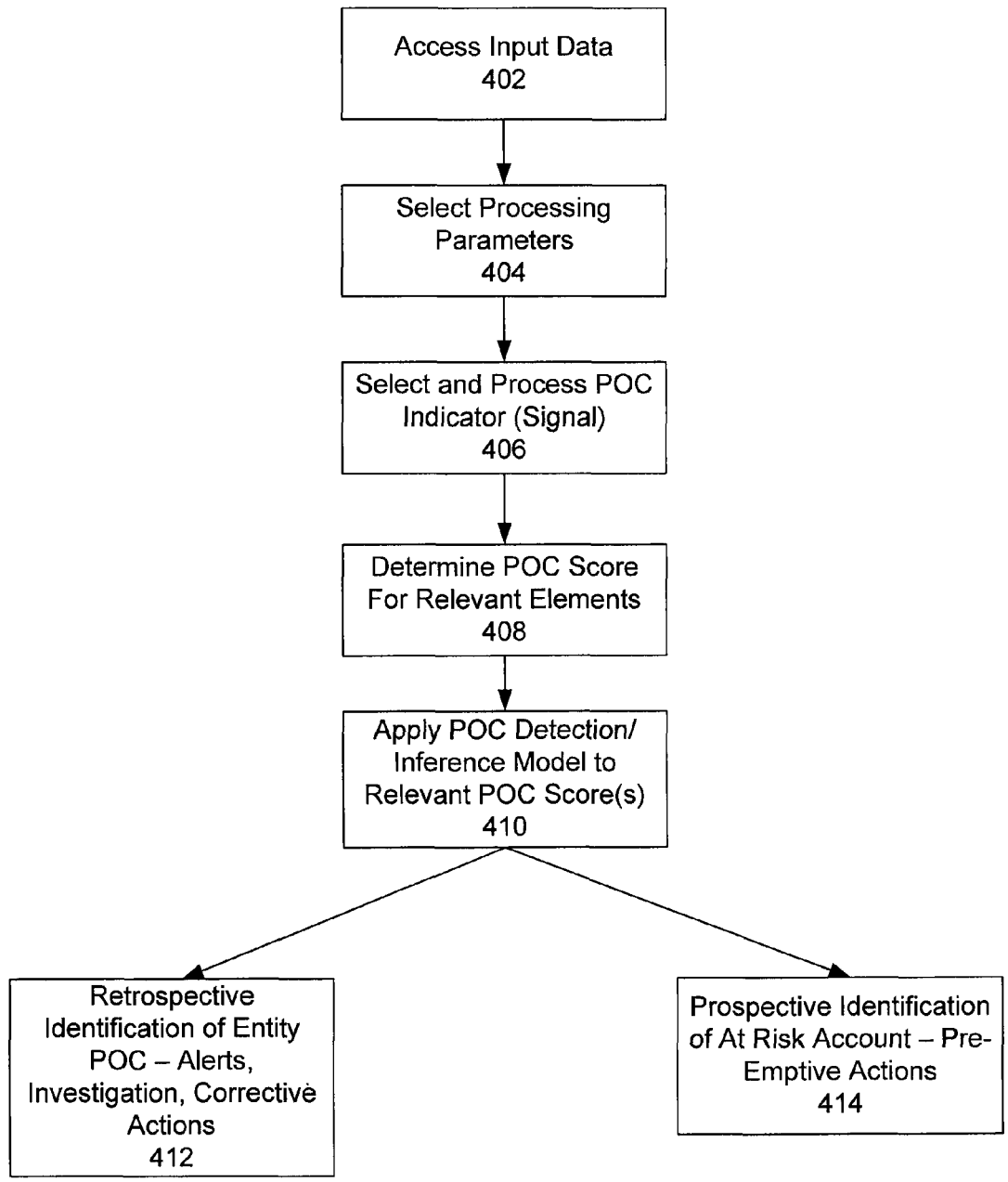
FIG. 4 is a flowchart illustrating certain of the data processing operations that may be involved in implementing some embodiments of the invention.

FIG. 4 is a flowchart illustrating certain of the data processing operations that may be involved in implementing some embodiments of the invention. Note that the operations or functions depicted in FIG. 4 are for purposes of describing a relatively high level implementation of one or more embodiments of the invention; embodiments may include other operations or functions, where those other operations or functions may be implemented as part of those shown in the figure or as separate operations or functions in addition to those shown in the figure. Further, some embodiments may not include one or more of the operations or functions shown in the figure.

Referring to FIG. 4, in some embodiments the invention may be implemented by first accessing the desired set of input data (stage or step 402). As discussed, the input data selected may vary depending on the type of POC being investigated, or based on the fraud situation being considered (e.g., known or confirmed fraud, detection of a POC retrospectively or prospectively, etc.). Next, the processing parameters are selected for the data processing (stage 404). As discussed, this may include selecting the entity of interest, setting the time resolution, setting the "windows" to determine which data will be examined, etc. After selecting the processing parameters, the point of compromise signal or indicator is selected (stage 406). As discussed, various possible "signals" may be selected with the signal chosen being determined to some extent by the situation or available data. The signal may be subjected to processing operations to increase the signal-to-noise ratio (such as by removing the effects of auto-correlation between accounts), to account for missing or incomplete data (by normalizing the data to a baseline such as a nationwide signal or nationwide merchant category), to account for fluctuations in the volume of transactions (to remove trend, drift or seasonal effects), or by applying one or more filters to remove certain sources of noise.

Note that each fraudulent account can contribute both signal and noise. In the extreme case, a compromised account has only one previous transaction. In this case, it can be known with certainty where and when the compromise occurred. In such a case, the account is considered to have contributed only "signal". As the number of previous transactions grows, greater uncertainty is introduced. The uncertainty is increased when the previous transactions are also at the same entity, thus lifting the background. One approach is to identify and remove accounts that contribute the most noise, thereby leaving a higher residual signal-to-noise ratio. However, a balance must be struck between preserving data for statistical inference of a compromise and removing noise contributions. Statistical models used for detecting a signal among a noisy or indeterminate background may be used for such purposes. Such models typically operate to detect a time-varying signal among one or more of a random, pseudo-random, or generally static background.

Next, a POC score is determined for the relevant entities or elements (such as a transaction or account) of a payment transaction system (stage 408). As described, the POC score may be derived from the processed signal by application of a suitable statistical model or technique. The applied model or technique may depend on the type of entity involved, the type of input data, the retrospective or prospective nature of the investigation, etc. After determining the POC score, the score is evaluated to determine whether it is indicative of a point of compromise (stage 410). This may involve application of a threshold or test to the score, evaluation of the score by a suitable inference model, application of a signal estimation or detection model to the score or to the signal, etc.

If the POC score is for a suspect entity, then this may be considered a retrospective application of the invention. In response to identification of a suspected POC, issuers or account owners may be alerted, an investigation may be initiated to confirm that a compromise occurred, corrective actions may be implemented, etc. (stage 412). If the POC score is for an account, then this may be considered a prospective application of the invention. In such a use case, the invention has identified an at-risk account and pre-emptive actions may be taken to reduce the likelihood of fraud occurring within the account (stage 414), such as by notifying the account owner, blocking transactions, placing conditions on transactions, re-issuing an account, etc.

Figure 5:
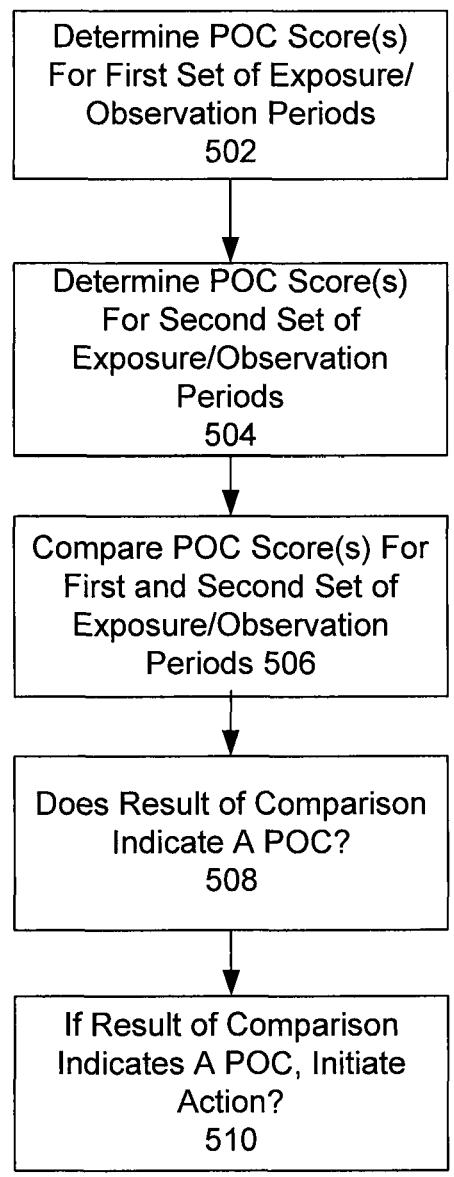
FIG. 5 is a flowchart illustrating a process for identifying a point of compromise within a payment transaction processing system or network, in accordance with some embodiments of the invention.

FIG. 5 is a flowchart illustrating a process for identifying a point of compromise within a payment transaction processing system or network, in accordance with some embodiments of the invention. In the process shown in FIG. 5, a change in the POC score for an entity or account over time may be used as an indication that an entity is the source of a compromise or that an account is likely to be the subject of an attempt at fraud. As shown in the figure, in some embodiments, a POC score (or scores if more than one entity or account are being considered) may be determined for a first set of exposure/observation periods or windows (stage or step 502). Next, a POC score (or scores) are determined for a second set of exposure/observation periods or windows (stage 504, where the exposure or observation window for the second set may or may not be different from those used in the first set). The two POC scores (or sets of scores) are then compared (stage 506). The comparison may be by performing a ratio, a statistical comparison, or by another suitable process. Next the result of the comparison is evaluated to determine if the result indicates a point of compromise (in the case of entity POC scores) or an at-risk account (in the case of account level POC scores) (stage 508). The evaluation may be by application of a threshold, an inference model, a statistical process, etc. If the result of the comparison indicates or suggests a point of compromise or at-risk account (with a sufficient confidence level), then a suitable action may be taken (stage 510, such as generating an alert, blocking an account, placing conditions on transactions conducted or processed by the entity, placing conditions on transactions conducted using the account, re-issuing an account, etc.).

Thus, FIG. 5 depicts a process to identify a POC or at-risk account by considering whether a POC score has changed over time in a significant enough manner (where this change may be an increase or a decrease). This type of detection model may be used in situations where the invention is used to monitor the POC score of an entity (or entities) over time and to "flag" the entity as a possible point of compromise when a significant enough change in the POC score is detected. In such a use of the invention, the inventive processes, methods, and operations may be performed in the background to provide an on-going evaluation (based on calculating the POC scores for different exposure and fraud observation windows) of the risk posed by multiple entities that are part of the payment transaction processing system. A "baseline" or standard POC score may be calculated for an entity based on the fraud history of the entity over a suitable timeframe, and the invention may be used to detect changes in that baseline score that might be indicative of a security breach.

Figure 6:
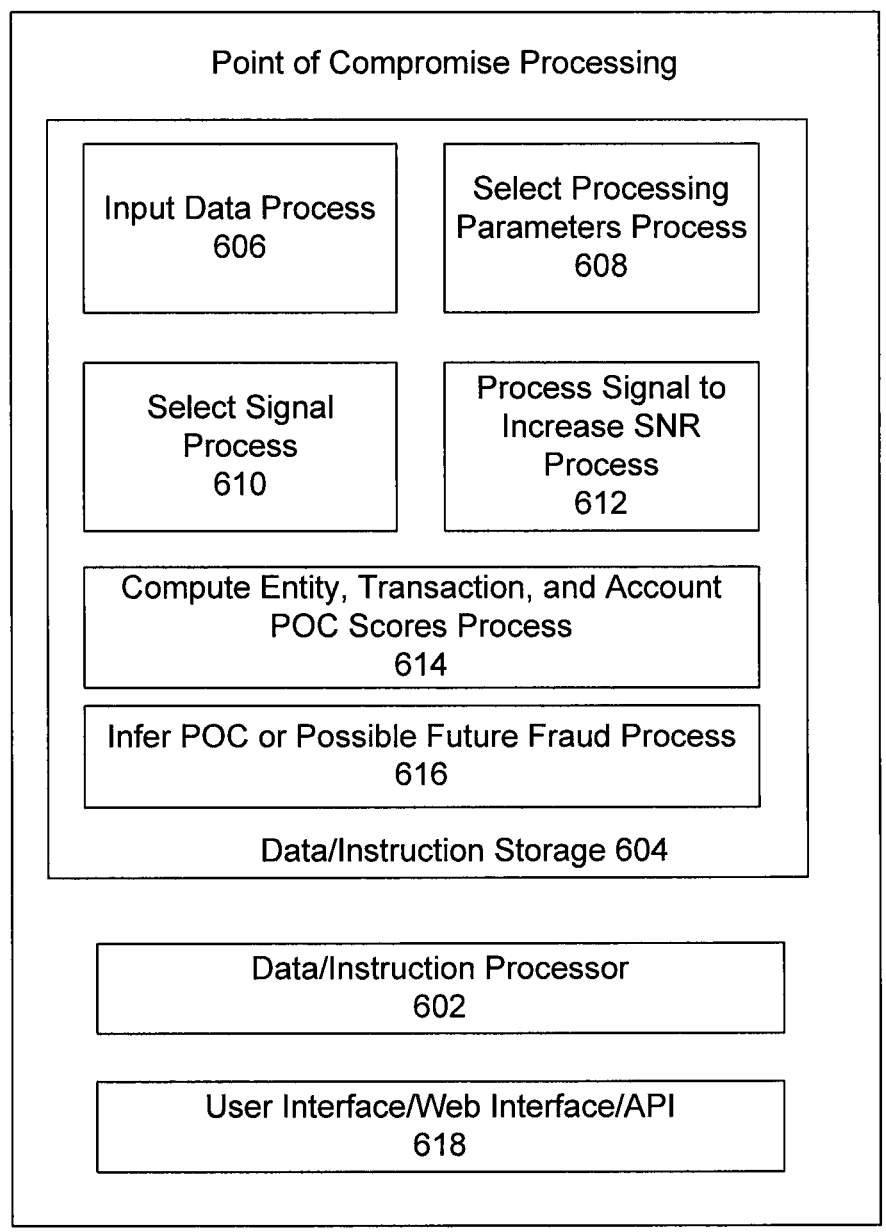
FIG. 6 is a diagram illustrating certain of the functional components that may be present in an apparatus or device used in identifying a point of compromise within a payment transaction processing system or network or in performing other data processing operations, in accordance with some embodiments of the invention.

In some embodiments, the point of compromise processing of the invention may be implemented using an apparatus as shown in FIG. 6, which is a diagram illustrating certain of the functional components that may be present in an apparatus or device used in identifying a point of compromise within a payment transaction processing system or network or in performing other data processing operations, in accordance with some embodiments of the invention. In some embodiments, the apparatus, data processing device, or computing device may be operated by a payment processing organization (such as Visa) or otherwise be associated with an element of a payment processing network. FIG. 6 includes a processing element, central processing unit (CPU), microprocessor, or other element operative to execute a set of instructions (identified as "Data/Instruction Processor 602" in the figure). The processor is programmed with a set of instructions stored in a suitable data storage or memory (identified as "Data/Instruction Storage 604" in the figure). When the instructions are executed by the programmed processor, the point of compromise processing apparatus operates to perform one or more of the processes, operations, or methods that are part of the invention. The storage element may also store data that is used by the processor to perform the inventive processes, operations, or methods. Such data may include information about the transactions, accounts, entities, etc., that is being processed to identify a possible point of compromise.

The executable instructions or data stored in the Data/Instruction Storage element may include executable instructions for one or more processes, functions, operations, or methods. For example, the instructions may include instructions which, when executed, implement a process to receive input data for the POC processing (identified as "Input Data Process 606" in the figure) and if needed, format or otherwise prepare that data for use in the POC processing. The input data may be provided by any suitable data input, network connection or interface, as represented by the element identified as "User Interface/Web Interface/API 618" in the figure. The instructions may include instructions which, when executed, implement a process to perform one or more of selecting parameters for use in the processing of the input data as part of determining a POC (identified as "Select Processing Parameters Process 608" in the figure), select the "signal" to be used as the indicator of a POC (identified as "Select Signal Process 610" in the figure), apply one or more signal processing techniques to enhance the detection of the signal, increase the signal-to-noise ratio or otherwise increase the reliability of detecting a POC (identified as "Process Signal to Increase SNR Process 612" in the figure), based on the signal, compute one or more of an entity, transaction or account POC score (identified as "Compute Entity, Transaction, and Account POC Scores Process 614" in the figure), or based on one or more of the POC scores and if relevant, other data, determine whether the scores indicate the presence of a POC (identified as "Infer POC or Possible Future Fraud Process 616" in the figure).

Note that embodiments of the invention may utilize some or all of the identified processes. Further, the identified processes may be implemented as a process that performs all of the functions described, only some of those functions, or additional functions to those described. Still further, embodiments may implement additional processes that perform various signal processing, estimation, detection or related functions. For example, in processing the signal, computing the POC scores, or determining whether a score or scores indicate the presence of a POC, embodiments of the invention may utilize signal processing, target detection, or statistical analysis techniques designed to reduce the incidence of false positives or improve other aspects of the overall process of identifying potential POCs.

Figure 7:
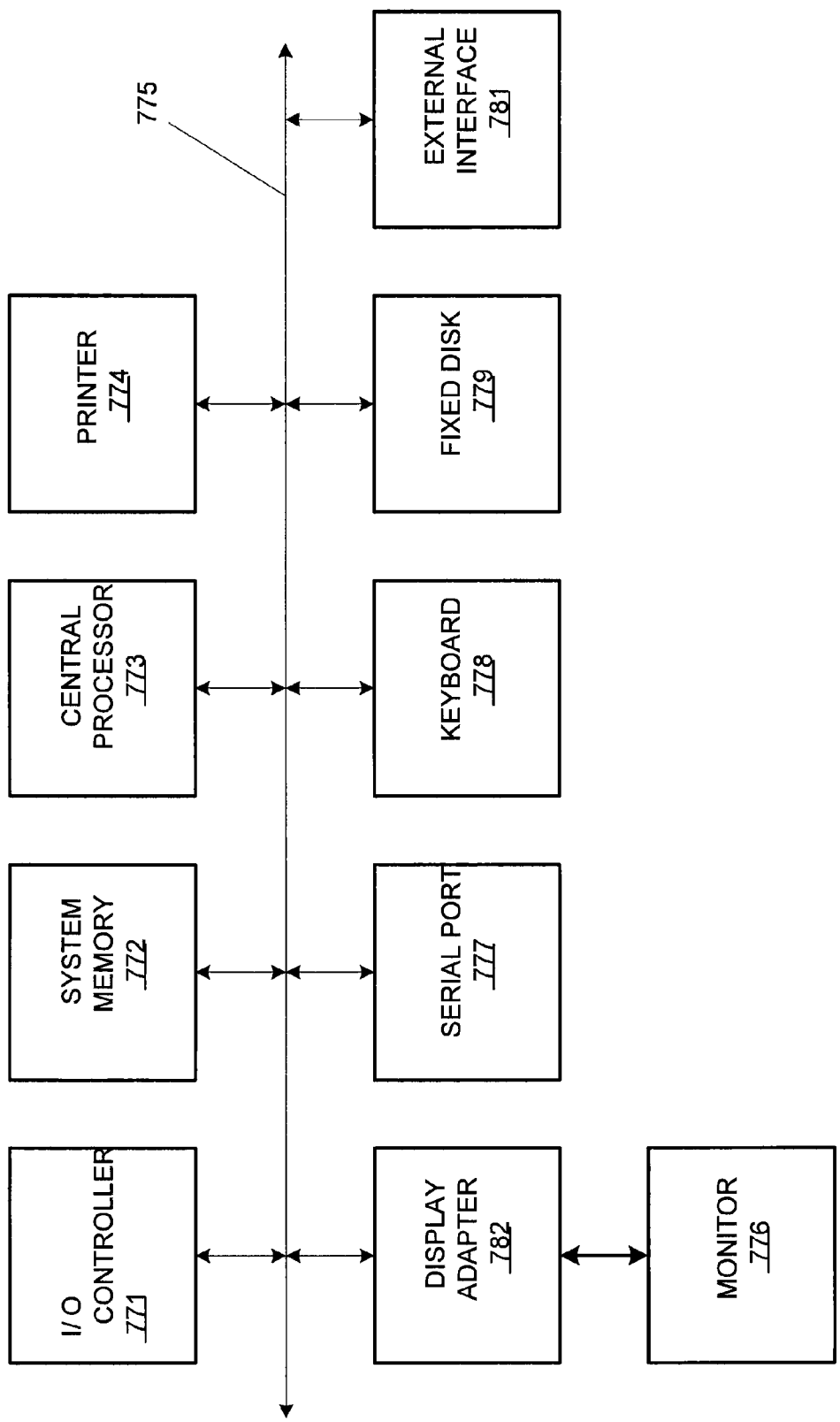
FIG. 7 is a diagram illustrating elements that may be present in an apparatus, device or system configured to execute a method or process in accordance with some embodiments of the invention.

As described with reference to FIG. 6, in some embodiments, the inventive methods, processes or operations for identifying a point of compromise, confirming a suspected point of compromise, or identifying transaction data or characteristics that may be used for such purposes may be wholly or partially implemented in the form of a set of instructions executed by a programmed central processing unit (CPU) or microprocessor. The CPU or microprocessor may be incorporated in an apparatus, server or other computing device operated by, or in communication with, a node of the authorization network (such as a payment processor or element of a payment processing network). In some embodiments, the apparatus, server or other computing device may incorporate additional elements to those depicted in FIG. 6. For example, FIG. 7 is a diagram illustrating elements that may be present in an apparatus, device or system configured to execute a method or process in accordance with some embodiments of the invention. The subsystems shown in FIG. 7 are interconnected via a system bus 775. Additional subsystems such as a printer 774, a keyboard 778, a fixed disk 779, a monitor 776, which is coupled to a display adapter 782, and others are shown. Peripherals and input/output (I/O) devices, which couple to an I/O controller 771, can be connected to the computer system by any number of means known in the art, such as a serial port 777. For example, the serial port 777 or an external interface 781 can be used to connect the computer apparatus to a wide area network such as the Internet, a mouse input device, or a scanner. The interconnection via the system bus 775 allows a central processor 773 to communicate with each subsystem and to control the execution of instructions that may be stored in a system memory 772 or the fixed disk 779, as well as the exchange of information between subsystems. The system memory 772 and/or the fixed disk 779 may embody a computer readable medium.

As described, some embodiments of the invention are directed to identifying a possible point of compromise (POC) in a payment transaction processing system. Such a POC may be responsible for permitting unauthorized access to payment transaction data or to payment account data belonging to multiple consumers. Examples of possible POCs include, but are not limited to, merchants, transaction data processors, account or transaction data storage elements, issuers, acquirers, payment processors for a group of acquirers, etc. The invention may also be used to investigate whether a group or set of entities (or a member of that group) is likely responsible for the release of confidential payment account or transaction data; for example, the invention may be used to investigate whether merchants in a certain location (based on zip code) or within a certain merchant category (such as an industry indicated by a specified MCC code), an acquirer, a member of a group of chain stores, etc. are the likely source of a compromise. If so, that group may be investigated to determine if there is a common characteristic that might suggest the actual point of compromise. Once obtained as the result of a compromise or breach of security, the improperly obtained payment transaction data or payment account data may be used to conduct fraudulent transactions. Thus, one aspect and benefit of the invention is to determine if there is a statistically valid correlation between use of a payment account or device (or set of accounts) at a specific entity and a subsequent increase in the fraudulent transactions associated with those accounts. Another aspect and benefit of the invention is to determine which types of transaction or account data, or transaction characteristics are best suited to be used to identify or confirm the existence of a POC. Yet another aspect and benefit of the invention is to identify an account or accounts that may be at-risk for future fraudulent activities, and thus to permit pro-active actions to prevent such fraud.

Embodiments of the invention typically involve the selection of an entity or group of entities to examine for the possible indication of a point of compromise. This determines the origin of the set of data to be processed. Selection of the entity for examination may be based on knowledge that fraud was committed in an account or transaction involving the entity. The data derived from the entity (e.g., transaction related data) may be narrowed down to a specified transaction period (similar to the exposure window). The fraud indicator or signal to be examined may be defined by a specified observation window at some time after the exposure window. Given the value of the signal over the fraud observation period (e.g., a value or amplitude as a function of time), the invention may process the signal to increase its signal-to-noise ratio or otherwise improve its quality. The processed signal may then be interpreted or converted by a suitable statistical approach or model into a POC score for the entity. The statistical approach or model may reduce the signal values over the time interval into a numerical score, function, etc. The output of the statistical approach or model may be subjected to a threshold or other form of "test" to determine if it (or its change from a previous value) suggests that the entity is a likely point of compromise. If so, appropriate investigative or corrective actions may be taken, alerts or notifications generated, further actions by the entity limited, etc.

In some embodiments, the approach of the invention computes a statistic (the "signal" or POC statistic) from observations during the fraud observation window. When interpreted in view of a suitable statistical test or model, the signal can be represented as a score or indicator that that reflects the likelihood that the entity of interest has been compromised. The type of observations used (the input data), the type of signal investigated, and the statistical model used to interpret the signal are all relevant to determining the effectiveness and accuracy of the invention at identifying an actual point of compromise or a suspected point of compromise. Among other factors, the methodology of the invention may be used to investigate the appropriate statistical methods to use, such as different normalization methods, ratios based upon different baselines, and other specialized techniques introduced to improve the reliability of the POC score. Further, the methodology may be used to investigate the use of various filters that act to select data from the available observations based upon specified criteria (such as transactions that appear within a certain time period or have only a single transaction associated with the entity of interest) and in so doing, improve the reliability of a POC score. As has been described, different detection accuracies may result by making different choices for the 1) entity, 2) the exposure period, 3) the fraud observation window, 4) the statistic (signal) computed, 5) the filters or signal processing applied, and 6) the statistical method or model used for converting the statistic into the POC Score(s).

An important aspect of embodiments of the invention is that the inventive methodology may be used (1) retrospectively to identify a suspected point of compromise in a situation in which fraud has occurred and the task is to determine which of several possible points of compromise is the likely source of a breach of security; and (2) prospectively to identify an account that is expected to be at-risk for experiencing fraudulent activity in the future and to enable actions to be taken to reduce that risk. In both types of use cases, embodiments of the invention provide a mechanism to reduce fraud and to ensure the integrity of the payment transaction processing system and its constituent elements.

In conceiving of, developing, and implementing the invention, the inventors have investigated the factors involved in identifying a point of compromise from payment account and transaction data, and have identified some of the factors that may impact the effectiveness of a particular set of parameters or data processing operations. For example, they determined that the parameter settings selected for use in identifying a point of compromise at one entity level (e.g., a merchant) may not be as effective at identifying a point of compromise at a different level (e.g., a payment processor). The inventors identified at least three reasons for this difference: 1. A relatively low conversion rate—the size of the breach (i.e., the number of compromised accounts) limits the number of accounts that can be converted into counterfeit cards (or another form of payment device) within a given time period. As a consequence, the percentage of detectable stolen accounts is small and the corresponding signal may be relatively weak; 2. Time correlation—entities typically have ongoing relationships with their customers (i.e., consumers will routinely go to the same supermarket). Therefore, many compromised accounts may have other transactions at the compromised entity which fall outside of the observation (or compromise) window. This correlation obscures the signal. With larger entities, this effect is more pronounced; and 3. Entity Correlation—accounts that have multiple transactions at the geographic level can create cross correlations which obscure the true location of the compromise. For example, if a merchant is located close to a compromised entity, many of the at-risk accounts may have made purchases at both locations. As subsequent counterfeit accounts are identified, it may be difficult to determine which entity was actually the source of the compromise. In general, the larger the entity (from a transaction volume perspective) the more difficult it is to decouple the correlations and properly evaluate the risk.

In some embodiments, the invention examines the subsequent fraud rate (or number of events) for payment accounts that engaged in a transaction with a specific merchant, or were part of a transaction processed by a specific transaction data processor (such as a processor for a group of acquirers). If the subsequent fraud rate (or another relevant "signal") varies to a sufficient degree over time, then the entity may be identified as a possible point of compromise because of the change in the value of the signal or the relevant POC score (i.e., its deviation from a baseline or normalized value). After being identified, further investigation may be conducted to determine whether the entity is in fact the source of a compromise. If so, corrective actions may be taken to notify account holders, re-issue accounts, block use of accounts, etc.

In some embodiments, the invention may be used with a set of different exposure and observation windows to provide an iterative process of calculating a POC score over time. This may be used to both identify a suspected point of compromise or at-risk account by noticing changes in a POC score, and to investigate the effectiveness of various parameter settings, signals, statistical models, inference models, etc.

It should be understood that the invention as described above can be implemented in the form of control logic using computer software in a modular or integrated manner. Based on the disclosure and teachings provided herein, a person of ordinary skill in the art will know and appreciate other ways and/or methods to implement the invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An apparatus for reducing fraud in a payment transaction system, the apparatus comprising:

an electronic processor programmed to execute a set of instructions; and a data storage device coupled to the electronic processor and having the set of instructions stored therein, wherein when the set of instructions are executed by the programmed electronic processor, the apparatus:

determines a point of compromise measure for each of one or more entities involved in accessing or processing payment transaction data;

determines a payment transaction measure for a payment transaction, the payment transaction measure obtained by combining the point of compromise measure for each of those of the entities involved in accessing or processing data for the payment transaction;

determines a payment account measure for a payment account, wherein the payment account measure is obtained by combining the payment transaction measures for each of a plurality of payment transactions conducted using the payment account;

evaluates the payment account measure to determine if it satisfies a predetermined condition indicating that the account is at-risk for fraud in the future, wherein evaluating the payment account measure to determine if it satisfies the predetermined condition comprises one or more of:

determining if the payment account measure exceeds a threshold value;

determining if the payment account measure exceeds a specified value for a specified amount of time; or determining if a ratio of the payment account measure for a first time period and the payment account measure for a second time period exceeds a specified value; and generates a notification or alters the operation of the account if the payment account measure satisfies the predetermined condition.

2. The apparatus of claim 1, wherein the apparatus determines the point of compromise measure for each of the one or more entities by:

accessing a set of input data;

receiving a selection of an indicator to be obtained from the input data; and determining a value of the point of compromise measure from the indicator.

3. The apparatus of claim 2, wherein the indicator is one of a subsequent fraud rate or number of fraud events for an entity after a set of accounts engaged in a transaction with that entity or transactions were processed by that entity;

an accumulated time-to-fraud for an entity;

a presence of testing activity; or an elevation of transaction authorization scores.

4. The apparatus of claim 2, wherein the apparatus determines a value of the measure from the indicator by applying a statistical model to the indicator.

5. The apparatus of claim 1, wherein the one or more entities includes one or more of a merchant, an issuer, a point of sale terminal, an acquirer, or a data processor for an acquirer.

6. The apparatus of claim 1, wherein the apparatus generates a notification or alters the operation of the account by:
generating a notification to an issuer that the account may be at-risk;
generating a notification to an account owner that the account may be at-risk;
blocking use of the account to prevent using the account to conduct a payment transaction; or
placing conditions on the type of transactions that may be conducted using the account.

7. A method of reducing fraud in a payment transaction system, the method comprising:
determining, by a computer processor, a point of compromise measure for each of one or more entities involved in accessing or processing payment transaction data;
determining a payment transaction measure for a payment transaction, the payment transaction measure obtained by combining the point of compromise measure for each of those of the entities involved in accessing or processing data for the payment transaction;
determining a payment account measure for a payment account, wherein the payment account measure is obtained by combining the payment transaction measures for each of a plurality of payment transactions conducted using the payment account;
evaluating the payment account measure to determine if it satisfies a predetermined condition indicating that the account is at-risk for fraud in the future, wherein evaluating the payment account measure to determine if it satisfies the predetermined condition comprises one or more of:
determining if the payment account measure exceeds a threshold value;
determining if the payment account measure exceeds a specified value for a specified amount of time; or
determining if a ratio of the payment account measure for a first time period and the payment account measure for a second time period exceeds a specified value; and
generating a notification or altering the operation of the account if the payment account measure satisfies the predetermined condition.

8. The method of claim 7, wherein determining the point of compromise measure for each of the plurality of entities further comprises:
selecting a set of input data;
selecting an indicator to be obtained from the input data; and
determining a value of the point of compromise measure from the indicator.

9. The method of claim 8, wherein the indicator is one of:
a subsequent fraud rate or number of fraud events for an entity after a set of accounts engaged in a transaction with that entity or transactions were processed by that entity;
an accumulated time-to-fraud for an entity;
a presence of testing activity; or
an elevation of transaction authorization scores.

10. The method of claim 8, wherein determining a value of the measure from the indicator further comprises applying a statistical model to the indicator.

11. The method of claim 7, wherein the one or more entities includes one or more of a merchant, an issuer, a point of sale terminal, an acquirer, or a data processor for an acquirer.

12. The method of claim 7, wherein generating a notification or altering the operation of the account further comprises one or more of:
generating a notification to an issuer that the account may be at-risk;
generating a notification to an account owner that the account may be at-risk;
blocking use of the account to prevent using the account to conduct a payment transaction; or
placing conditions on the type of transactions that may be conducted using the account.

13. The method of claim 7, wherein the point of compromise measure for the entity provides an indication of whether the entity involved in accessing or processing payment transaction data is likely to be a compromised entity at which a breach of security occurs resulting in an unauthorized release of data.

14. A method of identifying a point of compromise in a payment transaction processing system, the method comprising:
selecting, by a computer processor, a set of input data including transaction data of a payment account associated with an entity;
selecting an indicator to be obtained from processing the set of input data;
determining the indicator for the entity, wherein determining the indicator includes determining a payment account measure for the payment account, the payment account measure determined based on one or more payment transactions conducted using the payment account:
determining a point of compromise measure for the entity based on the indicator;
evaluating if the point of compromise measure satisfies a predetermined condition, wherein evaluating if the point of compromise measure satisfies the predetermined condition comprises one or more of:
determining if the point of compromise measure exceeds a threshold value;
determining if the point of compromise measure exceeds a specified value for a specified amount of time; or
determining if a ratio of the point of compromise measure for a first time period and the point of compromise measure for a second time period exceeds a specified value; and
identifying the entity as a point of compromise if the point of compromise measure satisfies the predetermined condition.

15. The method of claim 14, wherein the indicator is one of:
a subsequent fraud rate or number of fraud events for an entity after a set of accounts engaged in a transaction with that entity or transactions were processed by that entity;
an accumulated time-to-fraud for an entity;
a presence of testing activity; or
an elevation of transaction authorization scores.

16. The method of claim 14, wherein determining the point of compromise measure based on the indicator comprises applying a statistical model to the indicator.

17. The method of claim 14, wherein the entity is a merchant, an issuer, a point of sale terminal, an acquirer, or a data processor for an acquirer.

18. The method of claim 14, further comprising generating a notification if the point of compromise measure for the entity satisfies the predetermined condition.

19. The method of claim 14, further comprising processing the selected indicator to increase a signal-to-noise ratio prior to determining the point of compromise measure for the entity from the indicator.

20. A system comprising:
one or more processors; and
a memory device coupled to the one or more processors, the memory device including a set of instructions to be executed, wherein the set of instructions, when executed by the one or more processors, causes the one or more processors to:
receive a set of input data;
identify an indicator to be obtained from processing the set of input data;
determine the indicator for an entity, wherein determining the indicator includes determining a payment account measure for a payment account associated with the entity, the payment account measure determined based on one or more payment transactions conducted using the payment account;
determine a point of compromise measure for the entity from the indicator;
evaluate if the point of compromise measure satisfies a predetermined condition, wherein evaluating if the point of compromise measure satisfies the predetermined condition comprises one or more of:
determining if the point of compromise measure exceeds a threshold value;
determining if the point of compromise measure exceeds a specified value for a specified amount of time; or
determining if a ratio of the point of compromise measure for a first time period and the point of compromise measure for a second time period exceeds a specified value; and
identify the entity as a point of compromise if the point of compromise measure satisfies the predetermined condition.

21. The system of claim 20, wherein the indicator is one of:
a subsequent fraud rate or number of fraud events for an entity after a set of accounts engaged in a transaction with that entity or transactions were processed by that entity;
an accumulated time-to-fraud for an entity;
a presence of testing activity; or
an elevation of transaction authorization scores.

22. The system of claim 20, wherein the set of instructions that causes the one or more processors to determine a point of compromise measure from the indicator further causes the one or more processors to apply a statistical model to the indicator.

23. The system of claim 20, wherein the entity is a merchant, an issuer, a point of sale terminal, an acquirer, or a data processor for an acquirer.

24. The system of claim 20, wherein the set of instructions further causes the one or more processors to generate a notification if the point of compromise measure for the entity satisfies the predetermined condition.

25. The system of claim 20, wherein the set of instructions further causes the one or more processors to process the indicator to increase a signal-to-noise ratio prior to determining the point of compromise measure for the entity from the indicator.

* * * * *